United States Patent
Rolle et al.

(10) Patent No.: US 11,714,828 B2
(45) Date of Patent: Aug. 1, 2023

(54) ALIGNED PURPOSE DISASSOCIATION IN A MULTI-SYSTEM LANDSCAPE

(71) Applicant: SAP SE, Walldorf (DE)

(72) Inventors: Benny Rolle, Göttingen (DE); Matthias Vogel, Saarbrücken (DE); Carsten Pluder, Spiesen-Elversberg (DE); Ufuoma Ighoroje, Berlin (DE); Carlo Fuerst, Berlin (DE); Iwona Luther, Walldorf (DE)

(73) Assignee: SAP SE, Walldorf (DE)

( * ) Notice: Subject to any disclaimer, the term of this patent is extended or adjusted under 35 U.S.C. 154(b) by 323 days.

(21) Appl. No.: 17/186,934

(22) Filed: Feb. 26, 2021

(65) Prior Publication Data
US 2022/0277023 A1    Sep. 1, 2022

(51) Int. Cl.
*G06F 16/00* (2019.01)
*G06F 16/27* (2019.01)

(52) U.S. Cl.
CPC .................... *G06F 16/273* (2019.01)

(58) Field of Classification Search
CPC .................................................. G06F 16/273
USPC ......................................................... 707/615
See application file for complete search history.

(56) References Cited

U.S. PATENT DOCUMENTS

| | | |
|---|---|---|
| 7,308,704 B2 | 12/2007 | Vogel et al. |
| 7,350,237 B2 | 3/2008 | Vogel et al. |
| 7,831,567 B2 | 11/2010 | Luther et al. |
| 8,566,193 B2 | 10/2013 | Singh et al. |
| 9,043,874 B2 | 5/2015 | Riley |
| 9,286,301 B2 | 3/2016 | Motoyama |
| 9,600,831 B1 * | 3/2017 | Chou ................. G06Q 30/0246 |
| 9,904,796 B2 | 2/2018 | Pinder et al. |
| 10,740,487 B2 | 8/2020 | Barday et al. |
| 10,754,932 B2 | 8/2020 | Wiederspohn |
| 2014/0082753 A1 | 3/2014 | Sarferaz |

(Continued)

OTHER PUBLICATIONS

Help.sap.com [online], "End of Purpose (EoP) Check" Nov. 2020, [retrieved on Nov. 12, 2020], retrieved from: URL <https://help.sap.com/viewer/05a5505cc81943fb9d01e84cb2e135ef/750%20SP09/en-US/32b45853b2dc7425e10000000a44176d.html>, 3 pages.

(Continued)

*Primary Examiner* — Chelcie L Daye
(74) *Attorney, Agent, or Firm* — Fish & Richardson P.C.

(57) ABSTRACT

The present disclosure involves systems, software, and computer implemented methods for aligned purpose disassociation in a multi-system landscape. One example method includes receiving, from multiple systems, a can-disassociate status for a purpose for an object instance. The status from a respective system can be an affirmative status that indicates that the system can disassociate the purpose from the instance or a negative status that indicates that the system cannot disassociate the purpose from the instance. The received statuses are evaluated to determine a central disassociate purpose decision for the purpose for the instance. The central disassociate purpose decision can be to disassociate the purpose from the instance when no system has the negative status and to not disassociate the purpose from the instance when at least one system has the negative status. The central disassociate purpose decision is provided to at least some of the multiple systems.

20 Claims, 6 Drawing Sheets

(56) References Cited

U.S. PATENT DOCUMENTS

2018/0189485 A1    7/2018  Jain et al.
2020/0184087 A1    6/2020  Nos et al.

OTHER PUBLICATIONS

Help.sap.com [online], "Master Data Integration" Nov. 2020, [retrieved on Mar. 16, 2021], retrieved from: URL <https://help.sap.com/viewer/99218f2c48044ddc8f2ea30adc0e38a1/7.1.21/en-US/46b8065a4df01517e10000000a114a6b.html?q=master%20data%20integration>, 2 pages.

Help.sap.com [online], "SAP Information Lifecycle Management" Nov. 2020, [retrieved on Mar. 16, 2021], retrieved from: URL <https://help.sap.com/doc/PRODUCTION/c3b6eda797634474b7a3aac5a48e84d5/1610%20002/en-US/frameset.htm>, 4 pages.

Wikipedia.org [online], "General Data Protection Regulation" Jan. 2013, [retrieved on Mar. 16, 2021], relieved from: URL <https://en.wikipedia.org/wiki/General_Data_Protection_Regulation>, 16 pages.

\* cited by examiner

Day 1:

| System | Master Data Object | Purpose 310 | Local CAN-DISASSOCIATE-PURPOSE Decision 324 | Centralized Determinations 337 |
|---|---|---|---|---|
| A 302 | m 308a | p1 312 | yes 326 | 338 Disassociate p1<br>340 Disassociate p4 |
|  |  | p2 314 | no 328 |  |
| B 304 | m 308b | p2 316 | no 330 |  |
|  |  | p3 318 | no 332 |  |
| C 306 | m 308c | p3 320 | yes 334 |  |
|  |  | p4 322 | yes 336 |  |

FIG. 3  300

Day 2:

| System | Master Data Object | Purpose | Local CAN-DISASSOCIATE-PURPOSE Decision 402 | Centralized Determinations 420 |
|---|---|---|---|---|
| A 302 | m 308a | p2 406 | no 404 | 422 Disassociate p3 |
| B 304 | m 308b | p2 410 | no 408 |  |
|  |  | p3 414 | yes 412 |  |
| C 306 | m 308c | p3 418 | yes 416 |  |

FIG. 4  400

Day 3:

| System | Master Data Object | Purpose | Local CAN-DISASSOCIATE-PURPOSE Decision | Centralized 514 Determinations |
|---|---|---|---|---|
| A 302 | m 308 | p2 506 | no 504 | Cannot dissassociate p2 516 |
| B 304 | m 308 | p2 510 | no 508 | |
| C 306 | m 308 | | -- blocked -- 512 | |

FIG. 5  500

Day 4:

| System | Master Data Object | Purpose | Local CAN-DISASSOCIATE-PURPOSE Decision | Centralized 614 Determinations |
|---|---|---|---|---|
| A 302 | m 308 | p2 606 | yes 604 | Disassociate p2 616 |
| B 304 | m 308 | p2 610 | yes 608 | |
| C 306 | m 308 | | -- blocked -- 612 | |

FIG. 6  600

Day 5:

| System | Master Data Object | Local Actions / State | Centralized Determinations |
|---|---|---|---|
| A  302 | m 308a | -- blocked -- 704 | |
| B  304 | m 308b | -- blocked -- 706 | |
| C  306 | m 308c | -- blocked -- 702 | |

FIG. 7 700

Day 6:

| System | Master Data Object | Local Actions / State | Centralized Determinations |
|---|---|---|---|
| C  306 | m 308c | -- blocked -- 802 | |

FIG. 8 800

ALIGNED PURPOSE DISASSOCIATION IN A MULTI-SYSTEM LANDSCAPE

TECHNICAL FIELD

The present disclosure relates to computer-implemented methods, software, and systems for aligned purpose disassociation in a multi-system landscape.

BACKGROUND

Applications used for organizations can use master data (such as name and address) and transactional data (such as orders and bills). Transactional data typically references corresponding master data. For instance, a transactional object of type Order can refer to a master data object of type Customer. A given master data object can be referenced by one or more (or perhaps no) transactional objects. In some cases, data may be considered master data in one context and transactional data in another context. For example, insurance contract data may be considered transactional data with respect to a customer object but considered master data with respect to transactional insurance claim data. When an organizational landscape includes multiple systems, a master data replication process can be performed so that master data objects are consistent across systems.

SUMMARY

The present disclosure involves systems, software, and computer implemented methods for aligned purpose disassociation in a multi-system landscape. An example method includes: receiving, at a central system and from each of multiple systems in a multi-system landscape, a can-disassociate status for a first purpose for a first object instance, wherein the first purpose indicates a first type of processing that can be performed on the first object instance, and wherein the can-disassociate status for a respective system comprises either an affirmative can-disassociate status that indicates that the system can disassociate the first purpose from the first object instance or a negative can-disassociate status that indicates that the system cannot disassociate the first purpose from the first object instance; evaluating received can-disassociate statuses to determine a central disassociate purpose decision for the first purpose for the first object instance, wherein determining the central disassociate purpose decision includes: determining whether any system has the negative can-disassociate status; determining that the central disassociate purpose decision is to disassociate the first purpose from the first object instance based on no system having the negative can-disassociate status; and determining that the central disassociate purpose decision is to not disassociate the first purpose from the first object instance based on at least one system having the negative can-disassociate status; and providing the central disassociate purpose decision to at least some of the multiple systems.

Implementations can include one or more of the following features. Receiving the can-disassociate statuses can include each of the multiple systems pushing a respective can-disassociate status to the central system. Receiving the can-dissociate statuses can include polling the multiple systems for the can-disassociate statuses. The polling can be performed in response to receiving a request from a first system for a first central disassociate purpose decision for the first purpose for the first object instance. The central disassociate purpose decision can be provided when the central disassociate purpose decision is to disassociate the first purpose from the first object instance and not provided when the central disassociate purpose decision is to not disassociate the first purpose from the first object instance. The can-disassociate status for the first purpose for the first object instance can be determined locally by each respective system. The respective systems do not consider can-disassociate statuses of other systems when locally determining the respective can-disassociate status. A respective system can disassociate the first purpose from the first object in response to receiving a central disassociate purpose decision of disassociating the first purpose from the first object instance. A respective system can determine to not disassociate the first purpose from the first object instance in response to the system locally determining the affirmative can-disassociate status for the first purpose for the first object instance. A notification can be received indicating that a first system has blocked the first data object instance according to a retention policy after determining that no purposes are associated with the first object instance in the first system. A notification can be received indicating that the first system has destroyed the first data object instance in the first system after the retention policy has expired. The first object instance can be a master data object. The first object instance, when stored in a first system, can be a first transactional data object that references a first master data object, and when stored in a second system, can be a second master data object that does not reference any other data objects. Determining the central disassociate purpose decision can include overriding a negative can-disassociate status from a first system, wherein overriding the negative can-disassociate status from the first system comprises determining that the central disassociate purpose decision is to disassociate the first purpose from the first object instance despite the first system having the negative can-disassociate status. A first can-disassociate status for the first purpose for the first object instance can be received from a first system. After receiving the first can-disassociate status for the first purpose for the first object instance from the first system, a second, different can-disassociate status for the first purpose for the first object instance can be received from the first system. The central disassociate purpose decision can be updated based on receiving the second can-disassociate status. A determination can be made that a can-disassociate status has not been received from a first system after a predetermined period of time after sending a request to the first system. A default can-disassociate status can be determined for the first system. The default can-disassociate status can be used when determining the central disassociate purpose decision.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 3-8 are example tables that illustrate different days of a multi-day example.

DETAILED DESCRIPTION

Figure 1:
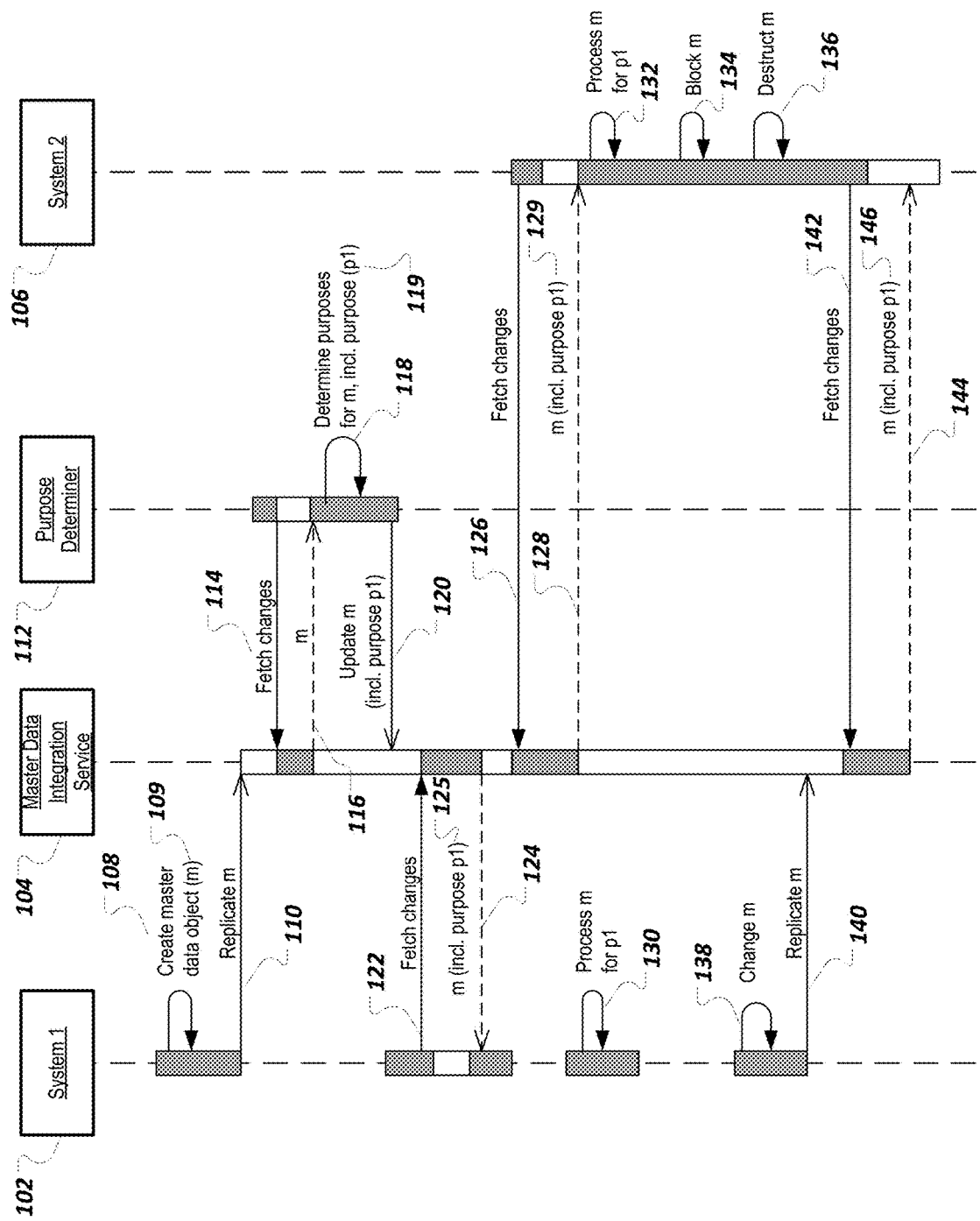
FIG. 1 is a sequence diagram illustrating an example problem scenario that can be caused by a distributed end of purpose determination.

Master data objects in a system can represent a concept for an organization. For example, a master data object may correspond to a workforce person, a business partner (e.g., vendor), a customer, etc. A master data object can be associated with one or more purpose references that indicate for which purposes the object can be processed. An "end of purpose" check for a master data object can be performed, in a given system, to determine whether an object is still needed. A system can disassociate a purpose from an object as part of (or in response to) an end of purpose check. However, distributed end of purpose checks and purpose disassociations can cause problems, as detailed below. For example, one system can disassociate a purpose from an object, delete or block an object after the purpose has been removed, but then receive an object copy with the purpose attached, from another system, due to replication. Replication can occur in distributed systems, including in a landscape in which a leading system for an object has not been defined.

An improved aligned purpose disassociation approach can be used, in which each system can perform a local "can disassociate purpose" decision for each purpose for each object, without actually disassociating purposes from objects at a can-disassociate decision time. A central component can perform a central evaluation of the local can-disassociate decisions, determine disassociate instructions, and send the disassociate instructions to the respective systems (e.g., to respective applications in respective systems). Although distributed systems are described herein, aligned purpose disassociation can be used for distributed applications that are each connected to a replication service, for example. Accordingly, use of "application" and "system" herein can both apply to the aligned purpose disassociation approach. The aligned purpose disassociation can be applied to master data that no longer has any transactional data referencing the master data. For example, aligned purpose disassociation can be applied to an insurance contract, if no pending claims or cases of damages refer to the insurance contract. As another example, aligned purpose disassociation can be applied to a customer object of an insurance company, if no insurance contracts refer to the customer, for example.

The aligned purpose disassociation approach can provide various advantages over an existing distributed end of purpose check approach. For example, end of purpose checks can involve synchronous calls between systems which may take an unacceptable amount of time to complete. The aligned purpose disassociation solution can use a more efficient, central, and asynchronous approach. The aligned purpose disassociation approach can work even with landscapes in which a leading system is not defined for an object. Purpose disassociation per purpose can increase regulatory compliance, by ensuring that data is only processed for a purpose if that purpose is still valid, and by enabling one system to block data when appropriate without requiring waiting for a synchronous response from each system in the landscape. With some existing approaches an object that remains active due to an associated first purpose could possibly be processed for a second purpose. With the aligned purpose disassociation approach, data is processed only for granted purposes. For instance, with the aligned purpose disassociation approach, the disassociation of purposes can be handled per purpose, rather than performing other actions, such as blocking an entire object when one of multiple purposes for the object is no longer applicable.

FIG. 1 is a sequence diagram illustrating an example problem scenario that can be caused by a distributed end of purpose determination. In the example of FIG. 1, as part of an organizational process 100, master data is created in a first system 102 and then replicated, using a master data integration (MDI) service 104, to a second system 106. For example, the first system 102 can be cloud software used to manage the workforce of a company and the second system 106 can be an ERP (Enterprise Resource Planning) system. Employee data might be created in the first system 102 and then replicated to the second system 106 so that the employees can be assigned to projects, for example, that are configured in the second system 106.

In further detail, at 108, a master data object 109 (e.g., an object "m") is created in the first system 102. At 110, the first system 102 (e.g., an application in the first system 102) sends a replicate request for the master data object 109 to the MDI service 104. The MDI service 104 can replicate the master data object 109 in the MDI service 104. Although the master data object 109 is mentioned here and below, it is noted that a copy of the master data object 109 can be sent to and included in various systems.

In this example, the first system 102 does not have a mechanism to define for which purpose the master data object 109 can be used. A purpose determiner 112 can be configured to determine purpose information for master data objects in the system. For instance, at 114, the purpose determiner 112 sends a request for data to the MDI service 104. The purpose determiner 112 can retrieve data (e.g., data matching one or more retrieval rules) periodically, or on an event-driven basis, from the MDI service 104. At 116, the MDI service 104 provides the requested data, including the master data object 109 (e.g., a copy of or a reference to the master data object 109) to the purpose determiner 112.

At 118, the purpose determiner 112 determines one or more purposes for the master data object 109, for example, based on one or more configured purpose rules that specify condition(s) of the master data object 109 that can result in assignment of a purpose. For example, the purpose determiner 112 can determine that a purpose p1 119 is to be assigned to the master data object 109. At 120, the purpose determiner 112 provides a request to the MDI service 104 to update the master data object 109 with the purpose 119. As another example, the purpose determiner 112 can update the master data object 109 with the purpose 119 and provide the updated master data object to the MDI service 104.

The MDI service 104 can notify the first system 102 about updated information. As another example, the first system 102 can periodically poll the MDI service 104 to determine if the MDI service 104 has any data updates relevant to the first system 102. For example, the first system 102 sends a request 122 for updated information to the MDI service 104.

The purpose determiner 112 can include information (e.g., a list) that specifies which system(s) are allowed to received data for which purposes. The list can specify, for example, which systems (or applications) can be used for the purpose 119. For instance, the purpose 119 can be associated with both the first system 102 and the second system 106. The purpose determiner 112 can share this list with the MDI service 104.

At 124, the MDI service 104 can determine, based on information received from the purpose determiner 112, that the first system 102 is associated with the purpose 119 and can send an updated master data object 125 to the first system 102 in response to the request 122. The updated master data object 125 can include or be linked to the purpose 119. If the second system 106 had sent a request for updated information to the MDI service 104 before the purpose 119 was associated with the master data object 109, the MDI service 104 may have instead responded with a "no updates" or similar message.

Similar to the request 122, the second system 106 sends a request 126 for updated information to the MDI service 104. At 128, the MDI service 104 can determine that the second system 106 is associated with the purpose 119 and can send, in response to the request 126, an updated master data object 129 (e.g., which includes or is linked to the purpose 119) to the second system 106.

At 130, the first system 102 processes the updated master data object 125 for the purpose 119. Similarly, at 132, the second system 106 processes the updated master data object 129 for the purpose 119.

After processing the master data object 129 for the purpose 119, the second system 106 can determine, internally, whether the updated master data object 129 can be blocked, for example, as part of an end of purpose check. That is, in existing systems, while the association of data with purposes may happen centrally (e.g., by the purpose determiner 112), the disassociation of expired purposes can happen separately in a distributed fashion, at or by each system. However, distributed disassociation checks and actions can cause various problems, as described below.

For example, if the second system 106 determines that the updated master data object 129 can be blocked, the second system 106 can perform a block operation 134 for the updated master data object 129. Similarly, the second system 106 can determine, internally, whether the updated master data object 129 can be destructed. If the updated master data object 129 can be destructed, the second system 106 can perform a destruct operation 136 for the updated master data object 129.

At 138, after the second system 106 has destructed the updated master data object 129, the first system 102 makes a change to the updated master data object 125. At 140, the updated master data object 125 is replicated to the MDI service 104.

The second system 106 sends a request 142, after the updated master data object 129 has been destructed, for updated information to the MDI service 104. At 144, the MDI service 104 sends, in response to the request 144, an updated master data object 146, which can be a copy of the updated master data object 125 that is still linked to the purpose 119, where the updated master data object 125 includes changes made by the first system 102 (i.e., at 138). The second system 106 receiving the updated master data object 146 with the purpose 119 is problematic, as the second system had already blocked and destroyed the corresponding master data object.

This type of problem (and other problems) can be avoided using an aligned purpose disassociation procedure described below. An aligned purpose disassociation procedure performed by all systems in the landscape can avoid the scenario shown in FIG. 1, where one system or application disassociates a purpose for an object, followed by another application or system configured with the same purpose making a change to the object, resulting in replication of the purpose-linked object back to the system that had previously disassociated the purpose. A central component (e.g., the MDI service 104) may still associate a purpose with the object, for example.

Other problems can also occur when purpose disassociation is not aligned. For example, new transactional data that references a master data object can be created in one system (e.g., the first system 102) and forwarded to another system (e.g., the second system 106) for further processing. For instance, an expense report from the first system 102 may be forwarded to the second system 106 to be posted to a financials application or repository. If the second system 106 has blocked or destroyed the underlying master data object, then the receipt of new transactional data for the master data object can lead to unexpected errors. Aligned purpose disassociation can solve these and other problems. With aligned purpose disassociation, disassociation of purposes happens in an aligned fashion. For instance, in the example of FIG. 1, the second system 106 can be allowed to disassociate a purpose for an object in alignment with other systems, including the first system 102.

Figure 2:
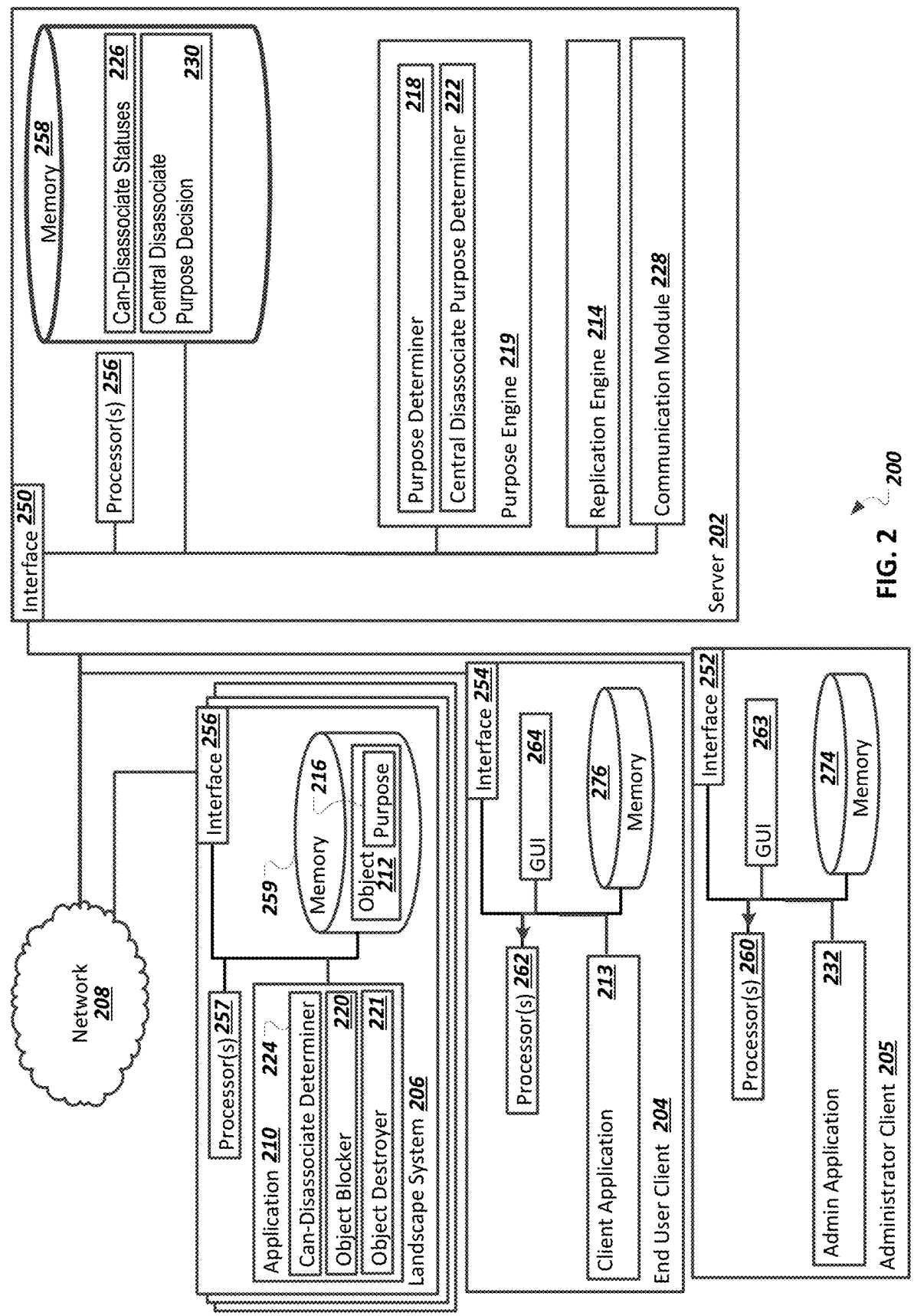
FIG. 2 is a block diagram illustrating an example system for aligned purpose disassociation in a multi-system landscape.

FIG. 2 is a block diagram illustrating an example system 200 for aligned purpose disassociation in a multi-system landscape. Specifically, the illustrated system 200 includes or is communicably coupled with a server 202, an end-user client device 204, an administrator client device 205, landscape systems 206, and a network 208. Although shown separately, in some implementations, functionality of two or more systems or servers may be provided by a single system or server. In some implementations, the functionality of one illustrated system, server, or component may be provided by multiple systems, servers, or components, respectively. For example, the server 202 includes different engines which may or may not be provided by a single system or server.

The landscape systems 206 can include multiple systems that exist in a multi-system landscape. An organization can use different systems, of different types, to run the organization, for example. The landscape systems 206 can include systems from a same vendor or different vendors. The landscape systems 206 can each include at least one application 210 for performing organizational processes and working with organizational data. Organizational data can include master data objects and transactional objects. For example, the application 210 can process a master data object 212. An end user can use a client application 213 (which may be a client version of the application 210) on the end-user client device 204 to view and interact with landscape data, including information from the master data object 212.

Regarding the handling of master data objects, various best practices can be applied by an organization. For example, the system 200 can be configured so that corresponding master data objects are consistent across all landscape systems 206. For instance, a replication engine 214 can distribute master data across the landscape systems 206 so that each application 210 can perform processing on the same consistent master data.

Various data protection rules and laws may require that data is only processed for legitimate specified purposes. The system 200 can implement a purpose requirement by associating purpose information with each object instance. For example, a purpose 216 has been associated with the master data object 212. A purpose determiner 218 (which can be included in a purpose engine 219) can determine appropriate purposes for an object and associate the purposes with the object. The landscape system 206 can receive the master object 212 and the associated purpose 216 from the replication engine 214, for example.

Purpose information for an object can specify for which purposes an object instance can currently be processed. Purpose information associated with an object instance is referred to herein as a purpose that is assigned to or otherwise associated with the object instance. Purpose information can be associated with an object by using a field of the object, metadata for the object, or associating a separate purpose object with the object. In some implementations, the purposes described herein are assigned to master data objects but not to transactional data objects.

Purposes for an object instance can have lifecycles that correspond to the lifecycle of the object instance. For example, a WorkforcePerson object may be created when an employee of the organization is hired. Accordingly, certain purposes, such as resource planning and payroll activities, can be assigned to the object instance. When an employee leaves the company, certain purposes, like resource planning, can be disassociated from the WorkforcePerson instance. Other purposes, such as payroll, might not be disassociated at the same time, since some payroll processing may still be performed for the employee even after the employee has left the organization (e.g., a final paycheck or an earned bonus, for example).

Objects that no longer have any associated purposes can be put into a blocked state for a period of time, for instance by an object blocker 220, before being deleted by an object destroyer 221. For instance, while an object instance with no attached purposes may no longer be used for transactions or have any need to be accessed by production systems, the object can be maintained, in a blocked state, for a certain number of days or years, to enable auditing, for example. An authorized service, such as an audit service, may be enabled to access the blocked object, but other production applications or services can be prevented from accessing the blocked object.

As part of an aligned disassociation approach, the landscape systems 206 can disassociate a purpose with an object in response to information received from a central disassociate purpose determiner 222, rather than strictly based on local decisions. Each landscape system 206 can provide information to the central disassociate purpose determiner 222. For example, a can-disassociate determiner 224 in each landscape system 206 can determine locally (e.g., without consulting other systems), for each purpose of an object, whether the purpose can be locally disassociated from the object. For example, each landscape system 206 can determine a "can-disassociate" status for each purpose for each object (or for requested purposes or objects).

A can-disassociate status for a respective landscape system 206 can be either an affirmative can-disassociate status that indicates that the landscape system 206 can disassociate a purpose from an object or a negative can-disassociate status that indicates that the landscape system 206 cannot disassociate the purpose from the object. The server 202 can collect received can-disassociate statuses as aggregated can-disassociate statuses 226.

The server 202 can receive the can-disassociate statuses 226 in a variety of ways. For example, a communications module 228 can support polling, eventing, and/or one or more APIs (Application Programming Interfaces) for sending data to and receiving data from the landscape systems 206. The landscape systems 206 can periodically push can-disassociate statuses to the server 202. As another example, the server 202 can pull can-disassociate statuses from the landscape systems 206 (e.g., using polling). In some cases, polling can occur in response to a given landscape system 206 sending a request for a central can-disassociate system for a given purpose of an object in that landscape system 206. Other eventing scenarios can be supported, where local can-disassociate information is sent to the server 202 in response to an event.

The central disassociate purpose determiner 222 can evaluate the aggregated can-disassociate statuses 226 to determine a central disassociate purpose decision 230 regarding disassociating a purpose from an object. For example, the central disassociate purpose determiner 222 can evaluate the aggregated can-disassociate statuses 226 to determine whether any landscape system 206 is unable to disassociate the purpose from the object. The central disassociate purpose determiner 222 can determine that the central disassociate purpose decision 230 is to disassociate the purpose from the object if no landscape system 206 is unable to disassociate the purpose from the object. The central disassociate purpose determiner 222 can determine that the central disassociate purpose decision 230 is to not disassociate the purpose from the object if at least one landscape system 206 is unable to disassociate the purpose from the object.

In some implementations and for some cases, the central disassociate purpose determiner 222 can essentially override or veto a local can-disassociate decision, based, for example, on an administrator or data protection expert decision or manual intervention, for instance, for an exception case. The administrator can use an administrative application 232 to provide input to the central disassociate purpose determiner 222, to override a particular value in the aggregated can-disassociate statuses 226, for example.

The purpose engine 219 can (e.g., using the communication module 228) provide the central disassociate purpose decision 230 to each landscape system 206. The purpose engine 219 can broadcast the central disassociate purpose decision 230 to the landscape systems 206, enable each landscape systems 206 to pull the central disassociate purpose decision 230, and/or send the central disassociate purpose decision 230 to all or particular landscape systems 206, such as in response to a particular request. The application 210 (or other component or engine) in each landscape system 206 can disassociate the purpose from the object in response to receiving the central disassociate purpose decision 230, if the central disassociate purpose decision 230 is in fact to disassociate the purpose from the object. In some cases, the central disassociate purpose decision 230 may be to not disassociate the purpose from the object, and the central disassociate purpose decision 230 can in these cases be informative (rather than directive). As another example, in some cases the central disassociate purpose decision 230 is communicated only if the central decision is to disassociate the purpose from the object (and the central decision is not communicated if the central decision is to not disassociate the purpose from the object). A given landscape system 206 disassociating a purpose from an object only in response to a directive from the server 202 can prevent a scenario in which a purpose is disassociated from an object when another landscape system 206 might still associate the purpose with the object.

The object blocker 220 can block an object (e.g., from all production processing) when no purposes are associated with the object (e.g., after all purposes have been disassociated), according to one or more retention policies. An object can be blocked, rather than destroyed, if one or more retention policies state that the object is to be maintained for access, outside of productive processing, only by authorized users. For example, a first retention policy can specify that the object is to be kept (e.g., in a blocked state) for ten years to support potential tax audits and a second retention policy can specify that the object is to be kept in a blocked state for twenty years to support employee safety audits (e.g., related to handling of dangerous chemicals). In this example, the object can be blocked for twenty years (e.g., a maximum of the ten and twenty year retention policies). After twenty years, the object can be destroyed. The object destroyer 221 can determine to destroy a blocked object in response to determining that all applicable retention reasons have expired.

Object destruction decisions and actions can occur locally and independently in each landscape system 206. For example, each application 210 can determine locally whether a blocked object is to be destroyed. For instance, the application 210 can determine to destroy an object when no purposes are associated with the object, no transactional data references the object, and no retention policy currently applies to the object. In response to an object destruction decision, the object destroyer 221 can destroy the object.

Although purposes for an object have been described, in some implementations, a purpose can be configured for a portion of an object. The portion can be a particular field or a set of two or more fields, for example. For instance, a workforce person object may have a name field, a business email address, and a personal email address. A given purpose may apply to the name and business email address but not the personal email address. The purpose disassociation procedures described herein can apply to portions of an object, or to particular field categories of the object (e.g., organization-related, personal, confidential, or contact information categories, etc.). In some implementations, a given customer can define custom field categories.

In some implementations, the system 200 supports a legal hold for an object. A legal hold can correspond to a decision or determination that certain data cannot be destroyed or changed, such as if the data corresponds or relates to a lawsuit or other legal action. The server 202 can communicate a legal hold message to the landscape systems 206 to inform the landscape systems 206 about the legal hold. Each landscape system 206 can store the object, in response to the legal hold notification, in a manner such that the object cannot be destroyed or changed without an appropriate authorized action. An authorized user can perform an action, for instance using the administrative application 232, to destroy data stored for a legal hold, such as after a legal need for the data has passed. A legal hold can be implemented by each landscape system 206 in various ways, such as by indefinitely blocking the object or by archiving a copy of the object.

In some implementations, the server 202 sends a restriction message to the landscape systems 206 about a restriction of processing of an object for one or more purposes. Each landscape system 206 can respond to the restriction message by blocking the object for all purposes included in the restriction message. A restriction message can be sent, for example, based on a need to restrict processing of personal data as determined by input from the administrative application 232, for example. Other various reasons may be a cause for why processing is to be restricted. For example, for an object that may otherwise be targeted for deletion, a data subject (e.g., an entity) may request the restriction of processing instead of the deletion of the object based on a need or desire to maintain the state of the object for use in a pending litigation. In this case, the processing of the object can be restricted and the object data can be prevented from being destructed (e.g., a destruction-preventing restriction of processing). In other cases, a data subject might opt-out of certain processing activities, such as individualized advertising. This type of restriction of processing can be performed without restricting or preventing later destruction of the objects.

The administrative application 232 can be used for other purposes. For example, the server 202 can provide information for display in the administrative application 232 that informs an administrator why certain master data objects are not yet disassociated from certain purposes or not yet blocked. For example, one landscape system 206 might have a wrong configuration and the wrong configuration might prevent the blocking of a master data object in other systems.

As used in the present disclosure, the term "computer" is intended to encompass any suitable processing device. For example, although FIG. 2 illustrates a single server 202, a single end-user client device 204, a single administrator client device 205, the system 200 can be implemented using a single, stand-alone computing device, two or more servers 202, or multiple client devices. Indeed, the server 202 and the client devices 204 and 205 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 202 and the client devices 204 and 205 may be adapted to execute any operating system or runtime environment, including Linux, UNIX, Windows, Mac OS®, Java™, Android™, iOS, BSD (Berkeley Software Distribution) or any other suitable operating system. According to one implementation, the server 202 may also include or be communicably coupled with an email server, a Web server, a caching server, a streaming data server, and/or other suitable server.

Interfaces 250, 252, 253, and 254 are used by the server 202, the end-user client device 204, the landscape system 206, and the administrator client device 205, respectively, for communicating with other systems in a distributed environment— including within the system 200— connected to the network 207. Generally, the interfaces 250, 252, 253, and 254 each comprise logic encoded in software and/or hardware in a suitable combination and operable to communicate with the network 207. More specifically, the interfaces 250, 252, 253, and 254 may each comprise software supporting one or more communication protocols associated with communications such that the network 207 or interface's hardware is operable to communicate physical signals within and outside of the illustrated system 200.

The server 202 includes one or more processors 256. Each processor 256 may be a central processing unit (CPU), a blade, an application specific integrated circuit (ASIC), a field-programmable gate array (FPGA), or another suitable component. Generally, each processor 256 executes instructions and manipulates data to perform the operations of the server 202. Specifically, each processor 256 executes the functionality required to receive and respond to requests from the end-user client device 204, for example. Similarly, each landscape system 206 includes one or more processors 257. Each processor 257. Each processor 257 executes instructions and manipulates data to perform the operations of the respective landscape system 206.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Peri®, ABAP (Advanced Business Application Programming), ABAP 00 (Object Oriented), any suitable version of 4GL, as well as others. While portions of the software illustrated in FIG. 2 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 202 includes memory 258. In some implementations, the server 202 includes multiple memories. The memory 258 may include any type of memory or database module and may take the form of volatile and/or non-volatile memory including, without limitation, magnetic media, optical media, random access memory (RAM), read-only memory (ROM), removable media, or any other suitable local or remote memory component. The memory 258 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 202. Similarly, each landscape system 206 includes memory 259. The memory 259 may store various objects or data associated with the purposes of the landscape system 206.

The end-user client device 204 and the administrator client device 205 may each be any computing device operable to connect to or communicate in the network(s) 207 using a wireline or wireless connection. In general, each of the end-user client device 204 and the administrator client device 205 comprises an electronic computer device operable to receive, transmit, process, and store any appropriate data associated with the system 200 of FIG. 2. Each of the end-user client device 204 and the administrator client device 205 can include one or more client applications, including the client application 213 or the administrative application 232, respectively. A client application is any type of application that allows a client device to request and view content on the client device. In some implementations, a client application can use parameters, metadata, and other information received at launch to access a particular set of data from the server 202. In some instances, a client application may be an agent or client-side version of the one or more enterprise applications running on an enterprise server (not shown).

The client device 204 and the administrator client device 205 respectively include processor(s) 260 or processor(s) 262. Each processor 260 or 262 included in the end-user client device 204 or the administrator client device 205 may be a central processing unit (CPU), an application specific integrated circuit (ASIC), a field-programmable gate array (FPGA), or another suitable component. Generally, each processor 260 or 262 included in the end-user client device 204 or the administrator client device 205 executes instructions and manipulates data to perform the operations of the end-user client device 204 or the administrator client device 205, respectively. Specifically, each processor 260 or 262 included in the end-user client device 204 or the administrator client device 205 executes the functionality required to send requests to the server 202 and to receive and process responses from the server 202.

Each of the end-user client device 204 and the administrator client device 205 is generally intended to encompass any client computing device such as a laptop/notebook computer, wireless data port, smart phone, personal data assistant (PDA), tablet computing device, one or more processors within these devices, or any other suitable processing device. For example, the end-user client device 204 and/or the administrator client device 205 may comprise a computer that includes an input device, such as a keypad, touch screen, or other device that can accept user information, and an output device that conveys information associated with the operation of the server 202, or the client device itself, including digital data, visual information, or a GUI 263 or a GUI 264, respectively.

The GUI 263 and the GUI 264 each interface with at least a portion of the system 200 for any suitable purpose, including generating a visual representation of the client application 213 or the administrative application 232, respectively. In particular, the GUI 263 and the GUI 264 may each be used to view and navigate various Web pages. Generally, the GUI 263 and the GUI 264 each provide the user with an efficient and user-friendly presentation of business data provided by or communicated within the system. The GUI 263 and the GUI 264 may each comprise a plurality of customizable frames or views having interactive fields, pull-down lists, and buttons operated by the user. The GUI 263 and the GUI 264 each contemplate any suitable graphical user interface, such as a combination of a generic web browser, intelligent engine, and command line interface (CLI) that processes information and efficiently presents the results to the user visually.

Memory 274 and memory 276 respectively included in the end-user client device 204 or the administrator client device 205 may each include any memory or database module and may take the form of volatile or non-volatile memory including, without limitation, magnetic media, optical media, random access memory (RAM), read-only memory (ROM), removable media, or any other suitable local or remote memory component. The memory 274 and the memory 276 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the respective client device.

There may be any number of end-user client devices 204 and administrative client devices 205 associated with, or external to, the system 200. Additionally, there may also be one or more additional client devices external to the illustrated portion of system 200 that are capable of interacting with the system 200 via the network(s) 208. Further, the term "client," "client device," and "user" may be used interchangeably as appropriate without departing from the scope of this disclosure. Moreover, while client device may be described in terms of being used by a single user, this disclosure contemplates that many users may use one computer, or that one user may use multiple computers.

FIG. 3 is an example table 300 that illustrates purpose disassociation decisions. Systems A 302, B 304, and C 306 each process an instance 308a, 308b, or 308c, respectively of a master data object m for different purposes. For example, a purpose column 310 indicates that system A 302 processes the master data object instance 308a for a p1 purpose 312 and a p2 purpose 314. System B 304 processes the master data object instance 308b for a p2 purpose 316 and a p3 purpose 318 (e.g., with the p2 purpose 314 being a same purpose as the p2 purpose 316, in different applications). System C 306 processes the master data object instance 308c for a p3 purpose 320 and a p4 purpose 322 (e.g., with the p3 purpose 320 being a same purpose as the p3 purpose 318).

A local can-disassociate purpose column 324 indicates local can-disassociate purpose decisions made by or in each system, for each associated purpose for each system. The table 300 indicates decisions that can occur on a first day of a multi-day example (or a first time point of a multi-time point example). That is, although days are shown, minutes, months, years, or any other type of time point can be used. Other tables in FIGS. 4-8 below discuss decisions made by systems on other days of the multi-day example. Over time, systems A 302, B 304, and C 306 can decide to disassociate purposes from the master data object or to block or destruct the master data object, for example. Each of systems A 302, B 304, and C 306 can make a local decision, independent of other systems, regarding whether the respective system can disassociate the master data object.

For example, system A 302 can make a first decision 326 that system A 302 can disassociate the p1 purpose 312 from the master data object instance 308a and a second decision 328 that system A 302 cannot currently disassociate the p2 purpose 314 from the master data object instance 308a. System B 304 can make a first decision 330 that system B 304 cannot currently disassociate the p2 purpose 316 from the master data object instance 308b and a second decision 332 that system B 304 cannot currently disassociate the p3 purpose 318 from the master data object instance 308b. System C 306 can make a first decision 334 that system C 306 can disassociate the p3 purpose 320 from the master data object instance 308c and a second decision 336 that system C 306 can disassociate the p4 purpose 322 from the master data object instance 308c.

Each system can provide data for respective internal decisions to a central component. The central component can maintain a data structure similar to the local can-disassociate purpose column 324, for example, based on data received from separate systems. The central component can make centralized determinations based on an overview/summary of the local decisions that are included in the data structure. For instance, and as shown in a centralized determination column 337, on the first day of the multi-day example, the central component can make a first determination 338, based on data received from all systems, that the purpose p1 can be disassociated from the master data object in each of the systems. This decision may be based on the fact that no system needs the purpose p1 for the master data object m 308. Similarly, the central component can make a second determination 340, based on data received from all systems, that the purpose p4 can be disassociated from the master data object in each of the systems, where the decisions is based on no system needing the purpose p4 for the master data object m 308. The central component can also determine that neither purpose p2 nor purpose p3 can be disassociated from the master data object in any system, since at least one system still needs purpose p2 for the master data object and at least one system still needs purpose p3 for the master data object.

FIG. 4 is an example table 400 that illustrates purpose disassociation decisions on a second day of a multi-day example. The table 400 illustrates a continuation of the example from FIG. 3. Based on the centralized determinations 338 and 340 that purpose p1 and purpose p4 can be disassociated from the master data object, system A 302 has disassociated purpose p1 312 from the master data object instance 308a and system C 306 has disassociated purpose p4 322 from the master data object instance 308c (e.g., purpose p1 312 and purpose p4 322 no longer appear in the table 400).

The table 400 also illustrates new local decisions made by or for system A 302, system B 304, and system C 306, with respect to purposes for the master data object. On the second day (or other second time point), as indicated in a local can-disassociate purpose column 402, system A 302 can make a decision 404 that system A 302 cannot currently disassociate purpose p2 406 from the master data object instance 308a. System B 304 can make a first decision 408 that system B 304 cannot currently disassociate purpose p2 410 from the master data object instance 308b and a second decision 412 that system B 304 can disassociate a purpose p3 414 from the master data object instance 308b. System C 306 can make a decision 416 that system C 306 can disassociate purpose p3 418 from the master data object instance 308c.

As shown in a centralized determination column 420, on the second day of the multi-day example, the central component can make a determination 422, based on data received from all systems, that purpose p3 can be disassociated from the master data object in each of the systems, the decision based on no system needing purpose p3 for the master data object.

FIG. 5 is an example table 500 that illustrates purpose disassociation decisions on a third day of a multi-day example. The table 500 illustrates a continuation of the example from FIG. 4. Based on the centralized determination 442 that purpose p3 can be disassociated from the master data object, system B 304 has disassociated purpose p3 414 from the master data object instance 308b and system C 306 has disassociated purpose p3 418 from the master data object instance 308c (e.g., purpose p3 414 and purpose p3 418 no longer appear in the table 500).

The table 500 also illustrates new local decisions made by or for system A 302, system B 304, and system C 306, with respect to purposes for the master data object 308. On the third day (or other third time point), as indicated in a local can-disassociate purpose column 502, system A 302 can make a decision 504 that system A 302 cannot currently disassociate purpose p2 506 from the master data object instance 308a. Similarly, system B 304 can make a decision 508 that system B 304 cannot currently disassociate purpose p2 510 from the master data object instance 308b.

As illustrated by a blocked indicator 512, system C 306 has blocked the master data object instance 308c. For instance, a retention policy may apply to the master data object instance 308c in system C 306. As shown in a centralized determination column 514, on the third day of the multi-day example, the central component can make a determination 516, based on data received from all systems, that purpose p2 cannot be disassociated from the master data object in any of the systems, based on at least one system (e.g., system A 302 and system B 304) needing purpose p2 for the master data object.

FIG. 6 is an example table 600 that illustrates purpose disassociation decisions on a fourth day of a multi-day example. The table 600 illustrates a continuation of the example from FIG. 5, including new local decisions made by or for system A 302, system B 304, and system C 306, with respect to purposes for the master data object. On the fourth day (or other fourth time point), as indicated in a local can-disassociate purpose column 602, system A 302 can make a decision 604 that system A 302 can disassociate a purpose p2 606 from the master data object instance 308a. Similarly, system B 304 can make a decision 608 that system B 304 can disassociate a purpose p2 610 from the master data object instance 308b.

As illustrated by a blocked indicator 612, system C 306 has continued to block the master data object instance 308c. The master data object instance 308c can appear to be deleted to system users other than those who have specific authorization to view the blocked master data object instance. The master data object instance 308c may not be needed for regular processing but system C 306 may make the master data object 308c available to authorized users for a certain period of time, such as for an audit. As shown in a centralized determination column 614, on the fourth day of the multi-day example, the central component can make a determination 616, based on data received from all systems, that purpose p2 can be disassociated from the master data object in all of the systems, based on no systems needing purpose p2 for the master data object.

FIG. 7 is an example table 700 that illustrates a fifth day of a multi-day example. The table 700 illustrates a continuation of the example from FIG. 6, including new local decisions made by or for system A 302, system B 304, and system C 306, with respect to purposes for the master data object. As illustrated by a blocked indicator 702, system C 306 has continued to block the master data object instance 308c. Blocked indicators 704 and 706 indicate that system A 302 has blocked the master data object instance 308a and that system B 304 has blocked the master data object instance 308b, respectively. Since purposes have been removed based on guidance from the central component, master data object instances without any associated purposes can be blocked or destroyed by a local system without considering the object's state in other systems.

FIG. 8 is an example table 800 that illustrates a sixth day of a multi-day example. The table 800 illustrates a continuation of the example from FIG. 7. System A 302 and system B 304 have now both destroyed the master data object. A respective system can destroy a master data object after a retention period ends, for example. As illustrated by a blocked indicator 802, system C 306 has continued to block the master data object instance 308c.

Figure 9:
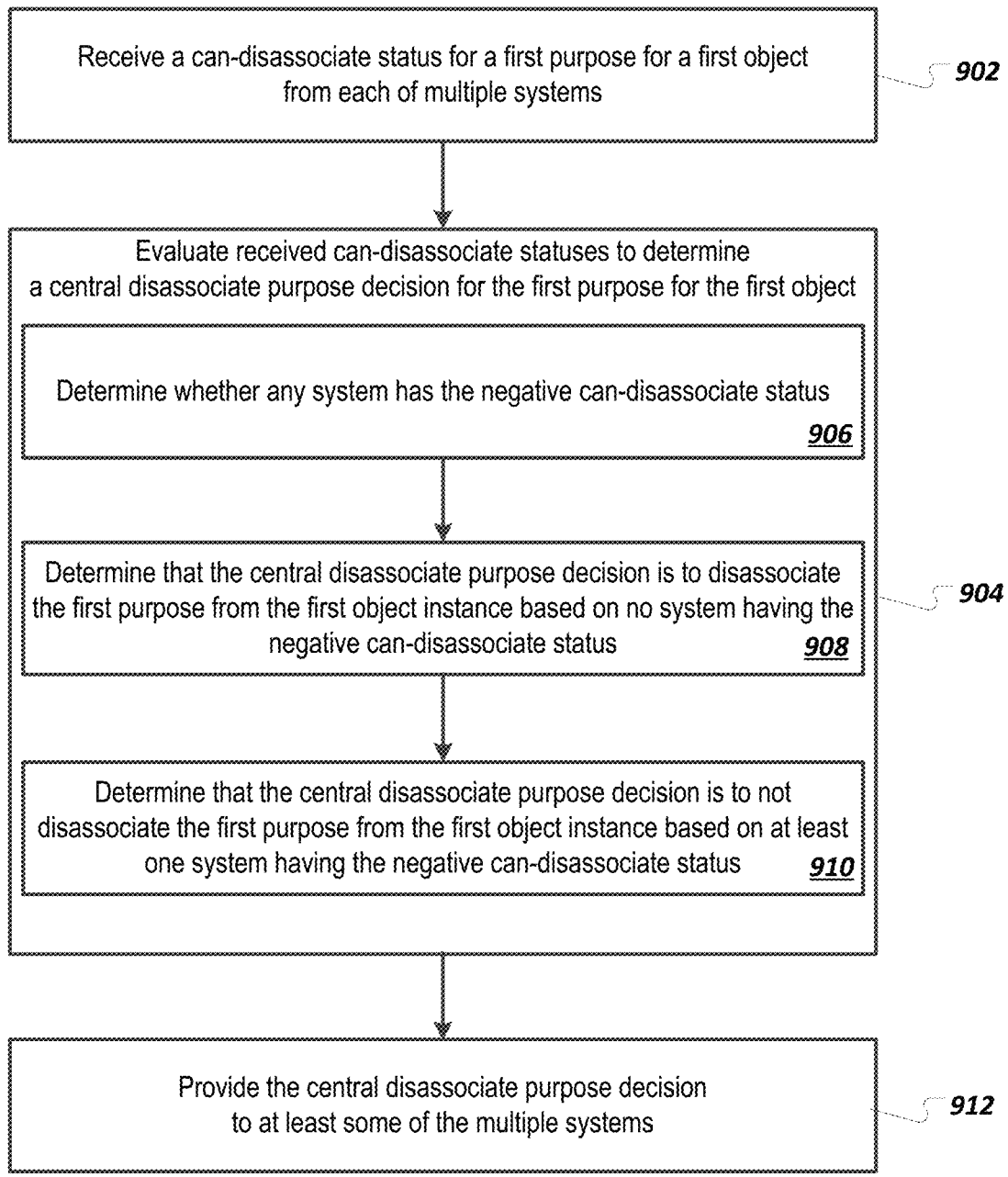
FIG. 9 is a flowchart of an example method for aligned purpose disassociation in a multi-system landscape.

FIG. 9 is a flowchart of an example method 900 for aligned purpose disassociation in a multi-system landscape. It will be understood that method 900 and related methods may be performed, for example, by any suitable system, environment, software, and hardware, or a combination of systems, environments, software, and hardware, as appropriate. For example, one or more of a client, a server, or other computing device can be used to execute method 900 and related methods and obtain any data from the memory of a client, the server, or the other computing device. In some implementations, the method 900 and related methods are executed by one or more components of the system 200 described above with respect to FIG. 2. For example, the method 1000 and related methods can be executed by the server 202 of FIG. 2.

At 902, a can-disassociate status for a first purpose for a first object instance is received, at a central system, from each of multiple systems in a multi-system landscape. The first purpose indicates a first type of processing that can be performed on the first object instance. The first object instance can be a master data object. As another example, the first object instance can be a master data object in a first system and a transactional data object (that references a master data object) in a different, second system. The can-disassociate status for a respective system can be either an affirmative can-disassociate status that indicates that the respective system can disassociate the first purpose from the first object instance or a negative can-disassociate status that indicates that the respective system cannot disassociate the first purpose from the first object instance.

Receiving the can-disassociate statuses can include each of the multiple systems pushing, providing, or making available a respective can-disassociate status to the central system. Receiving the can-dissociate statuses can include polling the multiple systems for the can-disassociate statuses and receive responses from the polling. The polling can be performed in response to receiving a request from a first system for a first central disassociate purpose decision for the first purpose for the first object instance. The can-disassociate status for the first purpose for the first object instance can be determined locally by each respective system. The systems can each locally determine a can-disassociate status without considering can-disassociate statuses of other systems.

At 904, the received can-disassociate statuses are evaluated to determine a central disassociate purpose decision for the first purpose for the first object instance.

At 906, determining the central disassociate purpose decision includes determining whether any system has the negative can-disassociate status.

At 908, determining the central disassociate purpose decision includes determining that the central disassociate purpose decision is to disassociate the first purpose from the first object instance based on no system having the negative can-disassociate status.

At 910, determining the central disassociate purpose decision includes determining that the central disassociate purpose decision is to not disassociate the first purpose from the first object instance based on at least one system having the negative can-disassociate status.

Determining the central disassociate purpose decision can include overriding a negative can-disassociate status from a first system. Overriding the negative can-disassociate status from the first system can include determining that the central disassociate purpose decision is to disassociate the first purpose from the first object instance despite the first system having the negative can-disassociate status.

At 912, the central disassociate purpose decision is provided to at least some of the multiple systems. The central disassociate purpose decision can be provided to each of the multiple systems or to a particular system in response to a request. In some cases, the central disassociate purpose decision can be provided only when the central disassociate purpose decision is to disassociate the first purpose from the first object instance (and not when the central disassociate purpose decision is to not disassociate the first purpose from the first object instance). A respective system can disassociate the first purpose from the first object in response to receiving a central disassociate purpose decision of disassociating the first purpose from the first object instance.

In some implementations, a first can-disassociate status for the first purpose for the first object instance can be received from a first system at a first point in time, and after receiving the first can-disassociate status for the first purpose for the first object instance from the first system, a second, different can-disassociate status for the first purpose for the first object instance can be received from the same first system at a later point in time. The central disassociate purpose decision can be updated (and in some cases recommunicated) based on the second can-disassociate status. In some implementations, a determination can be made that a can-disassociate status has not been received from a first system after a predetermined period of time after sending a request to the first system. For example, the first system may be down, there may be a network or other communication issue, etc. A default can-disassociate status can be determined for the first system, for the first purpose for the first object. For example, a default can-disassociate decision can be configured to be positive or negative for the first system (and can be configured differently for different systems). As another example, a system can be configured so that a default can-disassociate decision for objects of a certain type for a purpose of a certain type is either positive or negative, for instance. The default can-disassociate decision for the first system can be used when determining the central disassociate purpose decision.

The preceding figures and accompanying description illustrate example processes and computer-implementable techniques. But system 200 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 200 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
receiving, at a central system and from each of multiple systems in a multi-system landscape, a can-disassociate status for a first purpose for a first object instance, wherein the first purpose indicates a first type of processing that can be performed on the first object instance, and wherein the can-disassociate status for a respective system comprises either an affirmative can-disassociate status that indicates that the system can disassociate the first purpose from the first object instance or a negative can-disassociate status that indicates that the system cannot disassociate the first purpose from the first object instance;
evaluating received can-disassociate statuses to determine a central disassociate purpose decision for the first purpose for the first object instance, wherein determining the central disassociate purpose decision includes:
determining whether any system has the negative can-disassociate status;
determining that the central disassociate purpose decision is to disassociate the first purpose from the first object instance based on no system having the negative can-disassociate status; and
determining that the central disassociate purpose decision is to not disassociate the first purpose from the first object instance based on at least one system having the negative can-disassociate status; and
providing the central disassociate purpose decision to at least some of the multiple systems.

2. The computer-implemented method of claim 1, wherein receiving the can-disassociate statuses comprises each of the multiple systems pushing a respective can-disassociate status to the central system.

3. The computer-implemented method of claim 1, wherein receiving the can-dissociate statuses comprises polling the multiple systems for the can-disassociate statuses.

4. The computer-implemented method of claim 3, wherein the polling is performed in response to receiving a request from a first system for a first central disassociate purpose decision for the first purpose for the first object instance.

5. The computer-implemented method of claim 1, further comprising providing the central disassociate purpose decision when the central disassociate purpose decision is to disassociate the first purpose from the first object instance and not providing the central disassociate purpose decision when the central disassociate purpose decision is to not disassociate the first purpose from the first object instance.

6. The computer-implemented method of claim 1, wherein the can-disassociate status for the first purpose for the first object instance is determined locally by each respective system.

7. The computer-implemented method of claim 1, wherein the respective systems do not consider can-disassociate statuses of other systems when locally determining the respective can-disassociate status.

8. The computer-implemented method of claim 1, wherein a respective system disassociates the first purpose from the first object in response to receiving a central disassociate purpose decision of disassociating the first purpose from the first object instance.

9. The computer-implemented method of claim 1, wherein a respective system does not disassociate the first purpose from the first object instance in response to the system locally determining the affirmative can-disassociate status for the first purpose for the first object instance.

10. The computer-implemented method of claim 1, further comprising receiving a notification that a first system has blocked the first data object instance according to a retention policy after determining that no purposes are associated with the first object instance in the first system.

11. The computer-implemented method of claim 10, further comprising receiving a notification that the first system has destroyed the first data object instance in the first system after the retention policy has expired.

12. The computer-implemented method of claim 1, wherein the first object instance is a master data object.

13. The computer-implemented method of claim 1, wherein:
the first object instance, when stored in a first system, is a first transactional data object that references a first master data object; and
the first object instance, when stored in a second system, is a second master data object that does not reference any other data objects.

14. The computer-implemented method of claim 1, wherein determining the central disassociate purpose decision includes overriding a negative can-disassociate status from a first system, wherein overriding the negative can-disassociate status from the first system comprises determining that the central disassociate purpose decision is to disassociate the first purpose from the first object instance despite the first system having the negative can-disassociate status.

15. The computer-implemented method of claim 1, further comprising:
receiving a first can-disassociate status for the first purpose for the first object instance from a first system;
after receiving the first can-disassociate status for the first purpose for the first object instance from the first system, receiving a second can-disassociate status for the first purpose for the first object instance from the first system, wherein the second can-disassociate status is different from the first can-disassociate status; and
updating the central disassociate purpose decision based on receiving the second can-disassociate status.

16. The computer-implemented method of claim 1, further comprising:
determining that a can-disassociate status has not been received from a first system after a predetermined period of time after sending a request to the first system;
determining a default can-disassociate status for the first system; and
using the default can-disassociate status when determining the central disassociate purpose decision.

17. A system comprising:
one or more computers; and
a non-transitory computer-readable medium coupled to the one or more computers having instructions stored thereon which, when executed by the one or more computers, cause the one or more computers to perform operations comprising:
receiving, at a central system and from each of multiple systems in a multi-system landscape, a can-disassociate status for a first purpose for a first object instance, wherein the first purpose indicates a first type of processing that can be performed on the first object instance, and wherein the can-disassociate status for a respective system comprises either an affirmative can-disassociate status that indicates that the system can disassociate the first purpose from the first object instance or a negative can-disassociate status that indicates that the system cannot disassociate the first purpose from the first object instance;
evaluating received can-disassociate statuses to determine a central disassociate purpose decision for the first purpose for the first object instance, wherein determining the central disassociate purpose decision includes:
determining whether any system has the negative can-disassociate status;
determining that the central disassociate purpose decision is to disassociate the first purpose from the first object instance based on no system having the negative can-disassociate status; and
determining that the central disassociate purpose decision is to not disassociate the first purpose from the first object instance based on at least one system having the negative can-disassociate status; and
providing the central disassociate purpose decision to at least some of the multiple systems.

18. The system of claim 17, wherein receiving the can-disassociate statuses comprises each of the multiple systems pushing a respective can-disassociate status to the central system.

19. A computer program product encoded on a non-transitory storage medium, the product comprising non-transitory, computer readable instructions for causing one or more processors to perform operations comprising:
receiving, at a central system and from each of multiple systems in a multi-system landscape, a can-disassociate status for a first purpose for a first object instance, wherein the first purpose indicates a first type of processing that can be performed on the first object instance, and wherein the can-disassociate status for a respective system comprises either an affirmative can-disassociate status that indicates that the system can disassociate the first purpose from the first object instance or a negative can-disassociate status that indicates that the system cannot disassociate the first purpose from the first object instance;
evaluating received can-disassociate statuses to determine a central disassociate purpose decision for the first purpose for the first object instance, wherein determining the central disassociate purpose decision includes:
determining whether any system has the negative can-disassociate status;
determining that the central disassociate purpose decision is to disassociate the first purpose from the first object instance based on no system having the negative can-disassociate status; and
determining that the central disassociate purpose decision is to not disassociate the first purpose from the first object instance based on at least one system having the negative can-disassociate status; and
providing the central disassociate purpose decision to at least some of the multiple systems.

20. The computer program product of claim 19, wherein receiving the can-disassociate statuses comprises each of the multiple systems pushing a respective can-disassociate status to the central system.

* * * * *